United States Patent
Ohara

(10) Patent No.: US 10,576,665 B2
(45) Date of Patent: Mar. 3, 2020

(54) TIRE VULCANIZER

(71) Applicant: Toyo Tire Corporation, Itami-shi, Hyogo (JP)

(72) Inventor: Masaaki Ohara, Itami (JP)

(73) Assignee: TOYO TIRE CORPORATION, Itami-shi, Hyogo (JP)

( * ) Notice: Subject to any disclaimer, the term of this patent is extended or adjusted under 35 U.S.C. 154(b) by 0 days.

(21) Appl. No.: 16/321,972

(22) PCT Filed: Aug. 12, 2016

(86) PCT No.: PCT/JP2016/003729
§ 371 (c)(1),
(2) Date: Jan. 30, 2019

(87) PCT Pub. No.: WO2018/029726
PCT Pub. Date: Feb. 15, 2018

(65) Prior Publication Data
US 2019/0176368 A1 Jun. 13, 2019

(51) Int. Cl.
*B29D 30/06* (2006.01)
*B29C 33/02* (2006.01)
(Continued)

(52) U.S. Cl.
CPC ............. *B29C 33/02* (2013.01); *B29C 35/02* (2013.01); *B29D 30/0603* (2013.01);
(Continued)

(58) Field of Classification Search
CPC ............ B29D 30/0606; B29D 30/0629; B29C 33/005
See application file for complete search history.

(56) References Cited

U.S. PATENT DOCUMENTS 3,057,011 A * 10/1962 Knox ................. B29D 30/0606
425/46
3,460,197 A * 8/1969 Breza ................. B29D 30/0629
425/46
(Continued)

FOREIGN PATENT DOCUMENTS

JP 2001-96538 A 4/2001
JP 2009-6600 A 1/2009
(Continued)

OTHER PUBLICATIONS

International Search Report dated Nov. 1, 2016, issued in counterpart International Application No. PCT/JP2016/003729 (2 pages).

*Primary Examiner* — James P Mackey
(74) *Attorney, Agent, or Firm* — Westerman, Hattori, Daniels & Adrian, LLP

(57) ABSTRACT

A tire vulcanizer is provided which is capable of arranging a sector at a specified position during closing of a mold and suppressing a vulcanization molding defect. The tire vulcanizer includes: the sector that shapes a tread of a tire; paired upper and lower side plates that shape sidewalls of the tire; a segment to which the sector is fixed and which causes the sector to move in a tire radial direction; and mold parting surfaces defined by the sector and the side plates. Mold inner ends of the mold parting surfaces are arranged on the tread, and the mold parting surfaces extend outward in the tire radial direction from the mold inner ends. The sector includes paired upper and lower flange sections which respectively abut the paired upper and lower side plates in a state where the adjacent sectors in the tire circumferential direction tightly contact each other.

6 Claims, 7 Drawing Sheets

(51) Int. Cl.
*B29C 35/02* (2006.01)
*B29C 33/00* (2006.01)

(52) U.S. Cl.
CPC ........ B29D 30/0629 (2013.01); *B29C 33/005* (2013.01); *B29D 2030/0677* (2013.01)

(56) References Cited

U.S. PATENT DOCUMENTS

| | | | | |
|---|---|---|---|---|
| 3,464,090 | A * | 9/1969 | Cantarutti | B29D 30/0605 425/47 |
| 4,553,918 | A * | 11/1985 | Yoda | B29D 30/0606 425/46 |
| 4,895,692 | A * | 1/1990 | Laurent | B29C 43/102 264/326 |
| 5,190,767 | A * | 3/1993 | Beres | B29D 30/0629 425/28.1 |
| 5,208,044 | A * | 5/1993 | Miyata | B29C 33/202 425/32 |
| 6,066,283 | A * | 5/2000 | Nara | B29D 30/0629 264/326 |
| 6,250,901 | B1 * | 6/2001 | Nagata | B29C 33/30 425/46 |
| 6,408,910 | B1 * | 6/2002 | Lagnier | B29C 33/42 152/209.17 |
| 6,808,377 | B1 * | 10/2004 | Loney | B29D 30/0629 264/102 |
| 7,459,117 | B2 * | 12/2008 | Girard | B29D 30/0629 156/110.1 |
| 2003/0143294 | A1 * | 7/2003 | Fike | B29D 30/0629 425/54 |

FOREIGN PATENT DOCUMENTS

JP  2015-189349 A  11/2015
WO  2016/013604 A1  1/2016

* cited by examiner

[FIG. 1]
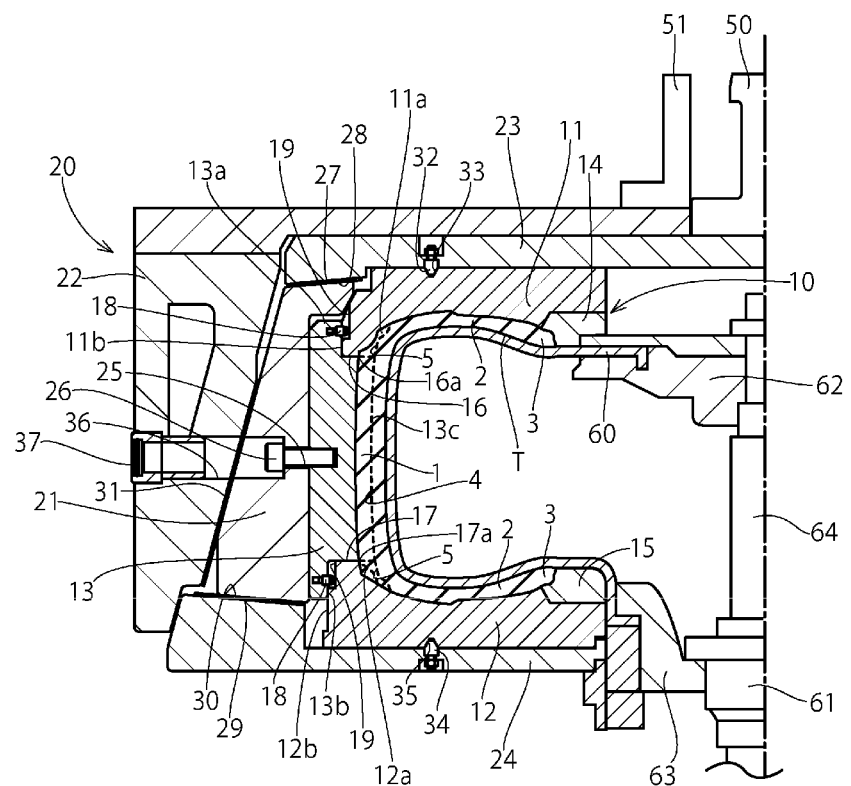

[FIG. 2]
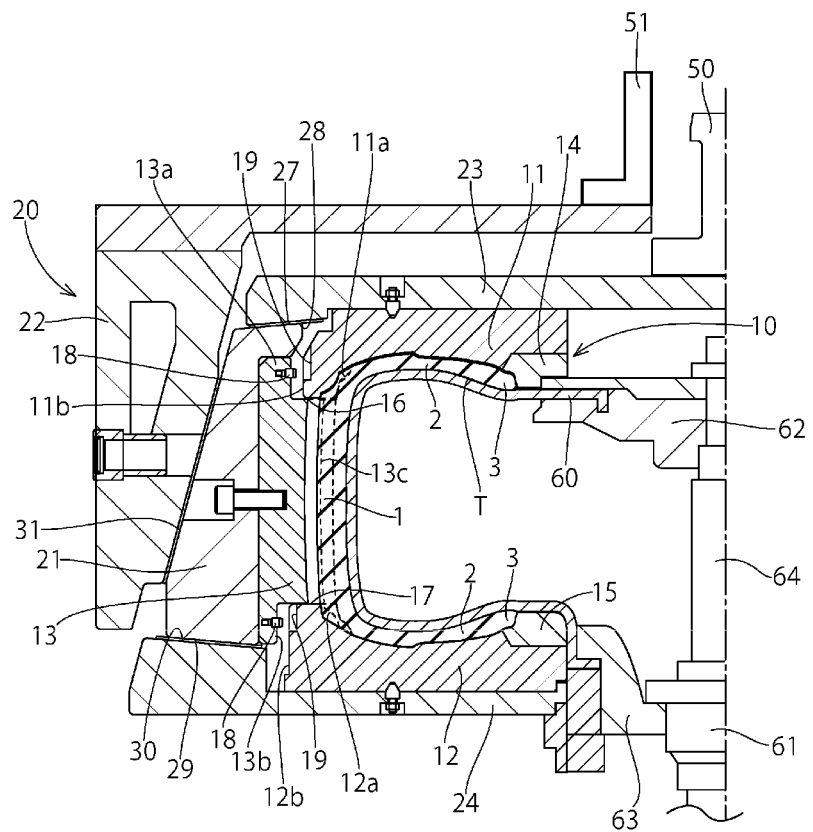

[FIG. 3]
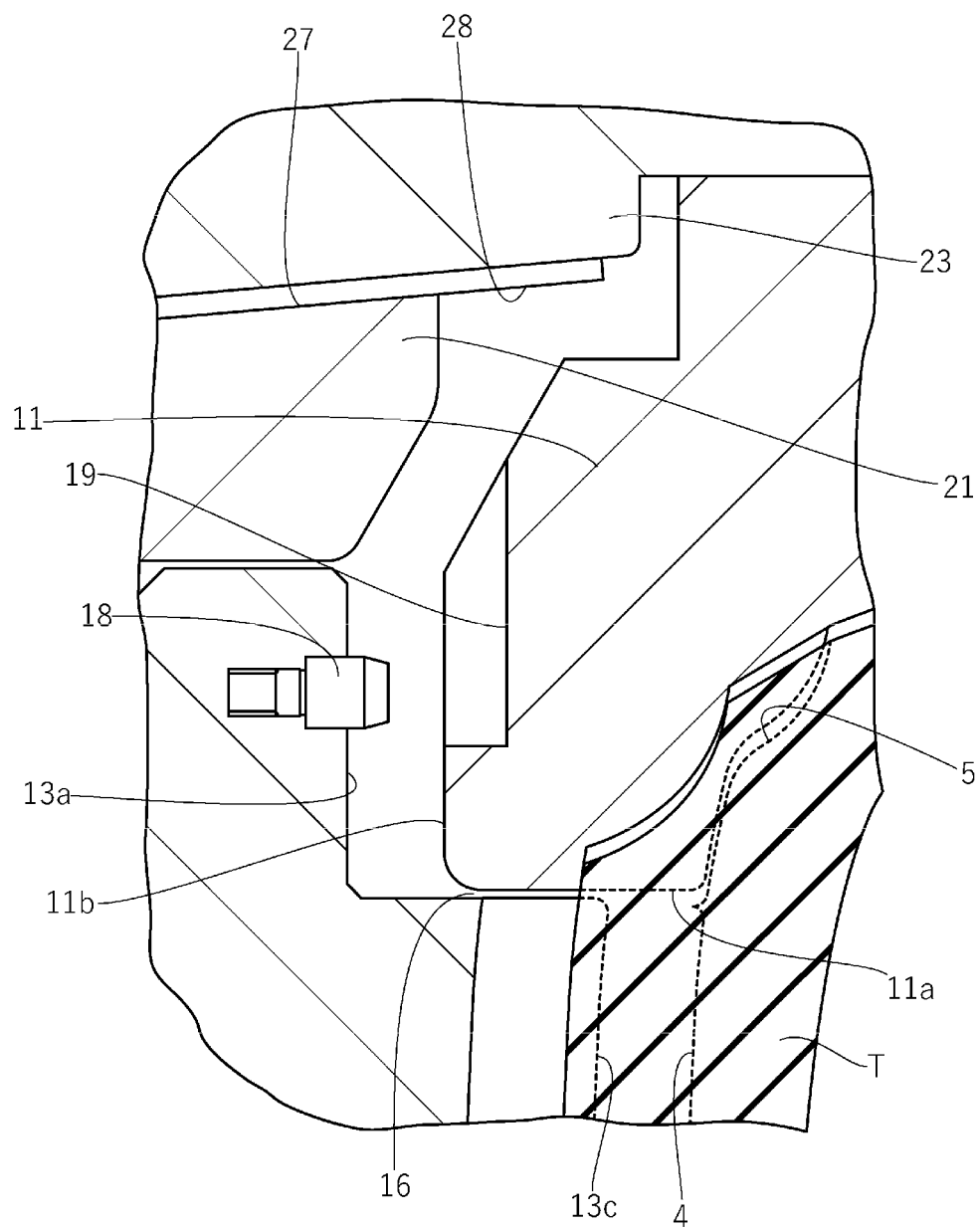

[FIG. 4]
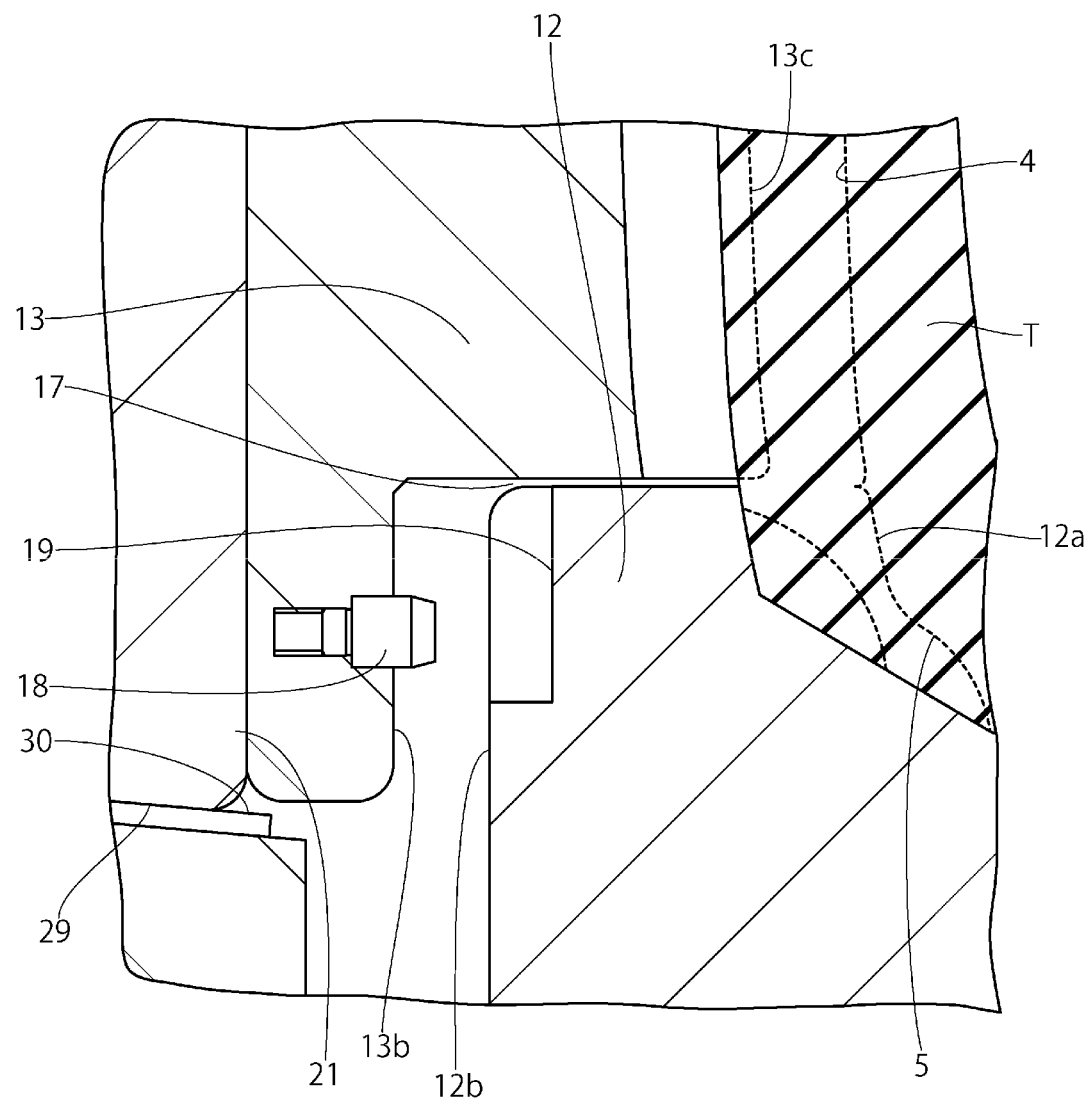

[FIG. 5]
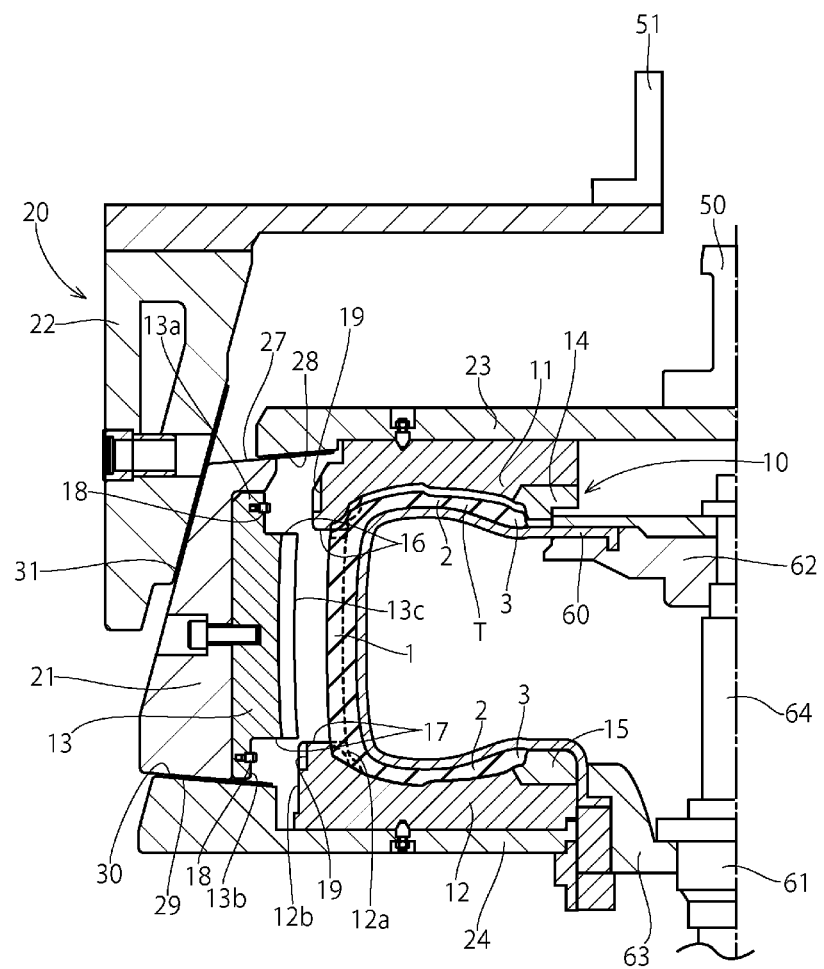

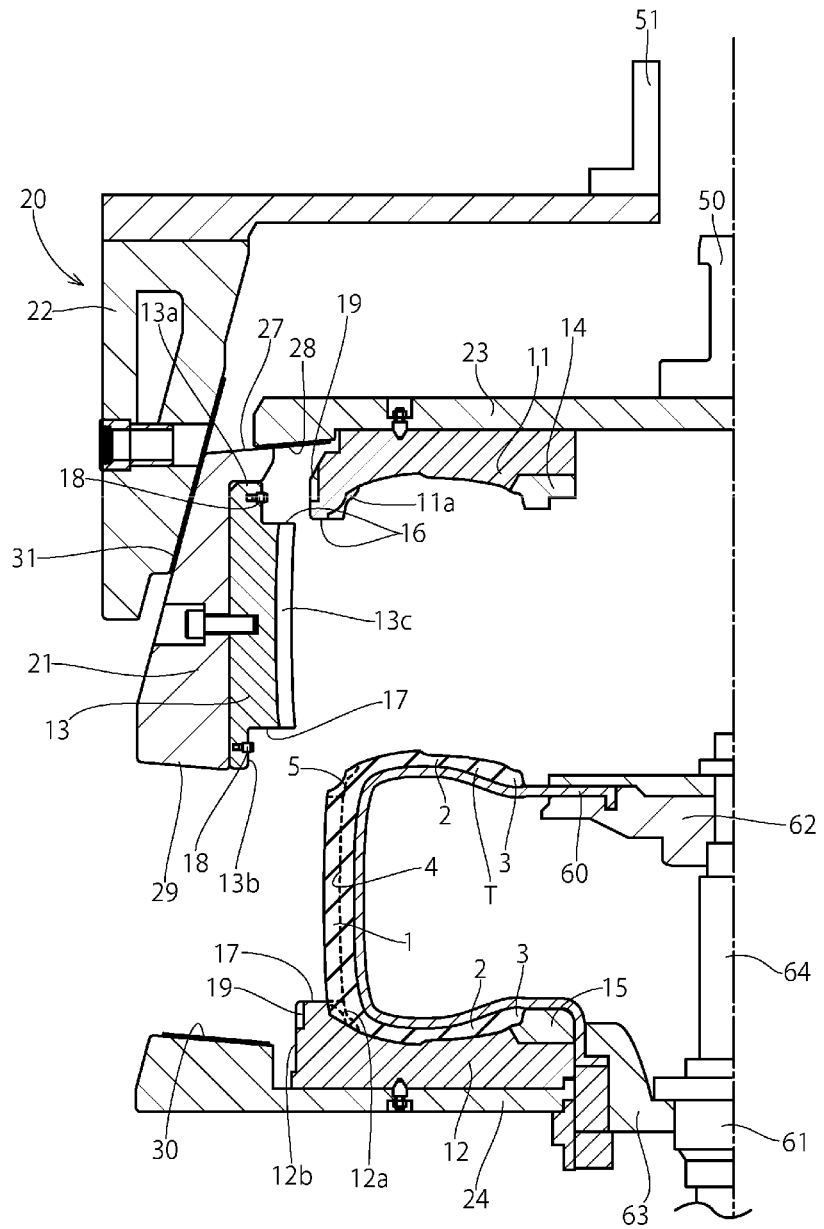
[FIG. 6]

[FIG. 7]
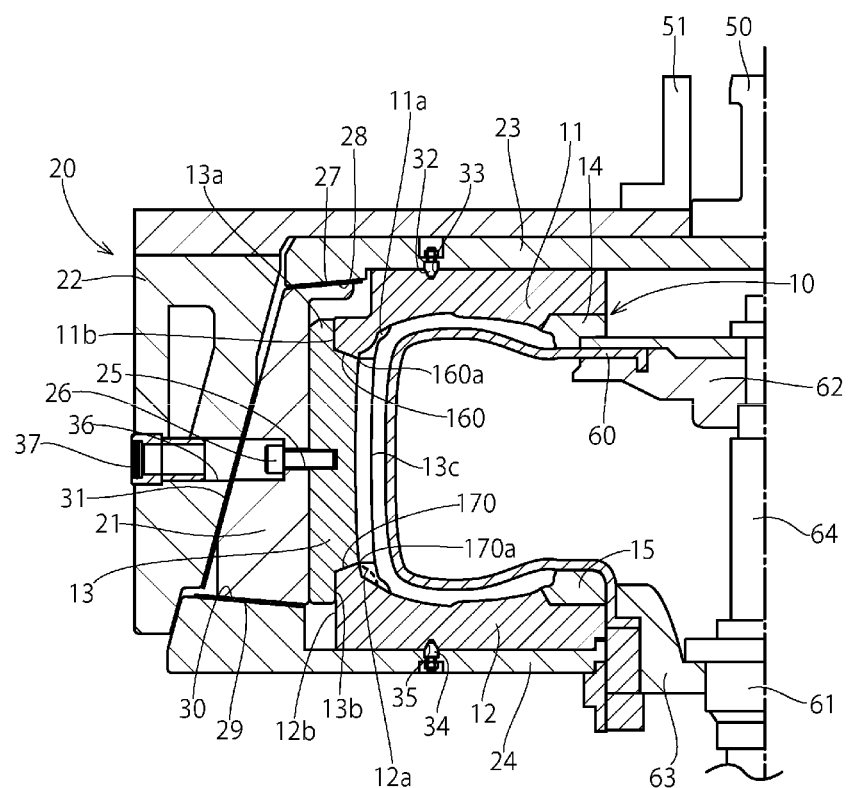

TIRE VULCANIZER

BACKGROUND OF THE INVENTION

1. Field of the Invention

The present invention relates to a tire vulcanizer.

2. Description of the Related Art

A tire is manufactured by building an unvulcanized green tire and vulcanizing and shaping the green tire in a specified shape by using a tire vulcanizer.

The tire vulcanizer that includes: a vulcanizing mold that shapes the green tire in the specified shape; and a drive mechanism that drives the vulcanizing mold and is referred to as a container has been known.

The vulcanizing mold that includes: a sector that shapes a tread of the tire; and paired upper and lower side plates that shape sidewalls of the tire has been known.

In this tire vulcanizer, the green tire is set onto the lower side plate in a mold open state where the upper side plate and the sector are separated from the lower side plate. Thereafter, the drive mechanism lowers the upper side plate and causes the sector to move inward in a tire radial direction. In this way, the upper side plate and the sector come close to the lower side plate, and the vulcanizing mold is brought into a mold closed state. Here, the sector is divided into plural pieces in a circumferential direction. The pieces of the sector are radially separated in a mold open state, and gather to have a ring shape in the mold closed state.

A pattern having various projected and recessed shapes is provided on an outer surface of each of the tread and the sidewalls. In recent years, in order to improve the tire design, there is a case where the projected and recessed shapes are continuously provided from the tread to each of the sidewalls. In the case where such a pattern is provided and where mold inner ends (a parting line) of mold parting surfaces that are defined by the sector and each of the side plates are arranged on a shoulder, rubber that spills out of the mold parting surfaces possibly remains in a conspicuous portion in external appearance, or the projected and recessed shapes, which continue from the tread to each of the sidewalls, possibly deviate in the circumferential direction in the conspicuous portion.

To handle such a problem, it has conventionally been proposed that the mold parting surfaces defined by the sector and each of the side plates are configured as surfaces that are parallel with the tire radial direction or surfaces that are obliquely inclined with respect to the tire radial direction and that the mold inner ends of the mold parting surfaces are arranged on the tread.

Patent Document: JP-A-2001-96538

However, in the case where the mold parting surfaces defined by the sector and each of the side plates are configured as the surfaces that are parallel with the tire radial direction or the surfaces that are obliquely inclined with respect to the tire radial direction, a radial position of the sector is not promptly determined when the sector moves in the tire radial direction to close the mold. As a result, a problem such as a vulcanization molding defect is likely to occur.

The present invention has been made in view of the above point and therefore has a purpose of providing a tire vulcanizer capable of arranging a sector at a specified position during closing of a mold and capable of suppressing a vulcanization molding defect.

SUMMARY OF THE INVENTION

A tire vulcanizer according to the present invention is a tire vulcanizer that vulcanizes and shapes a tire, and includes: a sector that shapes a tread of the tire and is divided in a tire circumferential direction; a segment to which the sector is fixed and which causes the sector to move in a tire radial direction; paired upper and lower side plates that shape sidewalls of the tire; and mold parting surfaces that are defined by the sector and the paired upper and lower side plates. Mold inner ends of the mold parting surfaces are arranged on the tread, and the mold parting surfaces extend outward in the tire radial direction from the mold inner ends. The sector includes paired upper and lower flange sections, each of which is projected from the mold parting surface, and the paired upper and lower flange sections respectively abut the paired upper and lower side plates in a state where the adjacent sectors in the tire circumferential direction tightly contact each other.

In a preferred aspect of the present invention, the mold parting surfaces may be provided in parallel with the tire radial direction.

In another preferred aspect of the present invention, either one of the flange section and the side plate may include a first projection pin that is projected toward the other, and the other may include a first recessed section into which the first projection pin is fitted.

In yet another preferred aspect of the present invention, in the case where each of the segments causes the sector to move inward in the tire radial direction, the adjacent sectors in the tire circumferential direction may come into contact with each other before the paired upper and lower flange sections respectively come into contact with the paired upper and lower side plates.

In further another preferred aspect of the present invention, paired upper and lower attachment plates that are respectively fixed to the paired upper and lower side plates and that support the segment in a manner to allow sliding of the segment are provided. The segment may include paired upper and lower sliding surfaces that respectively slide on the paired upper and lower attachment plates. The paired upper and lower sliding surfaces may be inclined such that outer sides in the tire radial direction thereof are directed toward a central portion in a tire width direction. When the segment causes the sector to move outward in the tire radial direction, the paired upper and lower sliding surfaces may respectively slide on the paired upper and lower attachment plates, and a distance between the mold parting surfaces may be increased. In this case, either one of the side plate and the attachment plate may include a second projection pin that is projected toward the other, and the other may include a second recessed section into which the second projection pin is fitted.

In further another preferred aspect of the present invention, the sector may be formed of iron.

In the tire vulcanizer according to the present invention, the sector includes the paired upper and lower flange sections, each of which is projected from the mold parting surface. The paired upper and lower flange sections respectively abut the paired upper and lower side plates in the state where the adjacent sectors in the tire circumferential direction tightly contact each other. Thus, even when the sector moves inward in the tire radial direction, the sector does not move inward in the tire radial direction from a specified mold closed position. Therefore, it is possible to arrange the sector at the specified position during closing of the mold, and it is thus possible to suppress a vulcanization molding defect.

BRIEF DESCRIPTION OF THE DRAWINGS

FIG. 1 is a half cross-sectional view of a state during vulcanization by a tire vulcanizer according to an embodiment.

FIG. 2 is a half cross-sectional view of a stage at which a diameter of a sector in the tire vulcanizer is increased.

FIG. 3 is an enlarged view of a main section in FIG. 2.

FIG. 4 is another enlarged view of the main section in FIG. 2.

FIG. 5 is a half cross-sectional view of a stage at which an increase in the diameter of the sector in the tire vulcanizer is completed.

FIG. 6 is a half cross-sectional view of a stage at which the sector in the tire vulcanizer is lifted.

FIG. 7 is a half cross-sectional view of a tire vulcanizer according to a modified embodiment.

DESCRIPTION OF THE PREFERRED EMBODIMENTS

A description will hereinafter be made on embodiments of the present invention with reference to the drawings.

As depicted in FIG. 1, a tire vulcanizer includes: a vulcanizing mold 10; a container 20 to which the vulcanizing mold 10 is attached; first lifting/lowering means 50 and second lifting/lowering means 51 that lift/lower the vulcanizing mold 10 and the container 20; and a bladder 60. In the tire vulcanizer, an unvulcanized green tire is set such that a tire axial direction (a tire width direction) is vertically arranged. Then, the tire vulcanizer vulcanizes and shapes the unvulcanized green tire in a specified shape by heating and pressurization.

The vulcanizing mold 10 is a shaping mold that includes: an upper and lower pair of an upper side plate 11 and a lower side plate 12; plural sectors 13 that are divided in a circumferential direction; and an upper and lower pair of bead rings 14, 15, and that shapes an outer surface (a design surface) of a tire T.

As a material of the vulcanizing mold 10, a metallic material such as aluminum, an aluminum alloy, or iron can be selected. As the material of the vulcanizing mold 10, iron is preferably selected due to low thermal expansion at a vulcanizing temperature. All of the paired upper and lower side plates 11, 12, the plural sectors 13, and the paired upper and lower bead rings 14, 15, which constitute the vulcanizing mold 10, are preferably made of iron so that a distance between mold parting surfaces generated in the vulcanizing mold 10 can easily be set to a desired distance at the vulcanizing temperature.

The sector 13 is a mold that shapes a tread 1 of the tire T. The sector 13 is divided into plural units (for example, nine units) in a tire circumferential direction, and the plural units are provided such that each thereof can be displaced in a manner to increase/reduce a diameter in a tire radiation direction (a tire radial direction). In a mold closed state where each of the sectors 13 is arranged at a mold closed position, the adjacent sectors 13 in the tire circumferential direction gather to have a ring shape.

The upper side plate 11 is a mold that shapes a sidewall 2 and a bead 3 arranged in an upper portion of the tire T. The lower side plate 12 is a mold that shapes the sidewall 2 and the bead 3 arranged in a lower portion of the tire T. The bead rings 14, 15 are provided on inner sides in the tire radial direction of the upper and lower pair of the upper side plate 11 and the lower side plate 12. The bead rings 14, 15 are configured such that the beads 3 of the tire T can be fitted thereto.

The vulcanizing mold 10 is provided with the mold parting surfaces, on each of which the mold is divided in the tire width direction, that is, mold parting surfaces 16 defined by the sector 13 and the upper side plate 11 and mold parting surfaces 17 defined by the sector 13 and the lower side plate 12. The mold parting surfaces 16, 17, which are defined by the sector 13 and the upper and lower pair of the upper side plate 11 and the lower sideplate 12, are provided in parallel with the tire radial direction that is a moving direction of the sector 13. In the mold parting surfaces 16, 17, mold inner ends 16a, 17a referred to as parting lines are located on the tread 1 of the tire T.

The sector 13 include an upper flange section 13a and a lower flange section 13b. The upper flange section 13a is projected upward from the mold parting surface 16 defined between the sector 13 and the upper side plate 11. The lower flange section 13b is projected downward from the mold parting surface 17 defined between the sector 13 and the lower side plate 12. In the mold closed state where the adjacent sectors 13 in the tire circumferential direction tightly contact each other, the upper flange section 13a abuts an end surface lib on an outer side in the tire radial direction that is provided in the upper side plate 11, and the lower flange section 13b abuts an end surface 12b on the outer side in the tire radial direction that is provided in the lower side plate 12.

Projected positions of the upper flange section 13a and the lower flange section 13b on the mold parting surfaces 16, 17 are preferably set such that, before the upper and lower pair of the upper flange section 13a and the lower flange section 13b come into contact with the upper and lower pair of the upper side plate 11 and the lower side plate 12, the adjacent sectors 13 in the tire circumferential direction come into contact with each other, and thereafter the upper flange section 13a and the lower flange section 13b respectively come into contact with the upper side plate 11 and the lower side plate 12.

As an example, the projected positions of the upper flange section 13a and the lower flange section 13b can be set such that each of a distance between the upper flange section 13a and the upper side plate 11 and a distance between the lower flange section 13b and the lower side plate 12 is 0.03 mm to 0.2 mm when the adjacent sectors 13 in the tire circumferential direction come into contact with each other.

Either one of the upper flange section 13a and the end surface lib of the upper side plate 11, which opposes the upper flange section 13a in the tire radial direction, (in this example, the upper flange section 13a) is provided with a first projection pin 18 that is projected toward the other (in this example, the end surface lib of the upper side plate 11), and the other is provided with a first recessed section 19 into which the first projection pin 18 is fitted in the mold closed state of the tire vulcanizer.

Similarly, either one of the lower flange section 13b and the end surface 12b of the lower side plate 12, which opposes the lower flange section 13b in the tire radial direction (in this example, the lower flange section 13b) is provided with the first projection pin 18 that is projected toward the other (in this example, the end surface 12b of the lower side plate 12), and the other is provided with the first recessed section 19 into which the first projection pin 18 is fitted in the mold closed state of the tire vulcanizer.

The at least one first projection pin 18, which is provided in each of the upper flange section 13a and the lower flange section 13b, is provided for each of the plural sectors 13. In this example, the first projection pin 18 is provided in a central portion in the tire circumferential direction of each of the upper flange section 13a and the lower flange section 13b.

The first projection pins 18 are fitted into the first recessed sections 19 when the vulcanizing mold 10 is closed. In this way, each of the first recessed sections 19 adjusts a relative position in the tire circumferential direction between the sector 13 and corresponding one of the upper and lower pair of the upper side plate 11 and the lower side plate 12, and thereby positions the sector 13.

The first projection pin 18 may be provided on each of the end surface lib of the upper side plate 11 and the end surface 12b of the lower side plate 12, and the first recessed section 19 may be provided in each of the upper flange section 13a and the lower flange section 13b.

In the vulcanizing mold 10, a main groove shaping rib (not depicted) and a lateral groove shaping rib 13c are provided in the sector 13. The main groove shaping rib is a rib for shaping a main groove that extends in the tire circumferential direction in the tread 1. The lateral groove shaping rib 13c is a rib for shaping a lateral groove 4 that extends in the tire width direction in the tread 1. In the vulcanizing mold 10, recessed section shaping ribs 11a, 12a are respectively provided on the upper side plate 11 and the lower side plate 12. Each of the recessed section shaping ribs 11a, 12a is a rib for shaping a recessed section 5 in the sidewall 2 in a continuous manner with the lateral groove 4 in the tread 1.

The container 20 includes: plural segments 21, each of which holds the sector 13; a jacket ring 22 that causes the segments 21 to move in the tire radial direction; an upper attachment plate 23 that supports the upper side plate 11 and the upper bead ring 14 and is arranged on an upper side of the segments 21; and a lower attachment plate 24 that supports the lower side plate 12 and the lower bead ring 15 and is arranged on a lower side of the segments 21.

On an outer side of the sector 13 in the tire radial direction, the segment 21 is provided for each of the divided sectors 13. The segment 21 is provided with a bolt hole 25 that penetrates the segment 21 in the tire radial direction, and is fixed to the sector 13 by a bolt 26 that is inserted in the bolt hole 25 from the outer side in the tire radial direction.

On an upper surface of the segment 21, an upper sliding surface 27 is inclined such that an outer side in the tire radial direction thereof is directed toward a central portion (that is, downward) in the tire width direction. The upper sliding surface 27 slides on an upper slide 28 that is provided in the upper attachment plate 23.

On a lower surface of the segment 21, a lower sliding surface 29 is inclined such that an outer side in the tire radial direction thereof is directed toward the central portion (that is, upward) in the tire width direction. The lower sliding surface 29 slides on a lower slide 30 that is provided in the lower attachment plate 24.

An inclination angle of each of the upper sliding surface 27 and the lower sliding surface 29 provided in the segment 21 is not particularly limited but is preferably equal to or larger than 5° and equal to or smaller than 10° with respect to the tire radial direction. In addition, the upper sliding surface 27 and the lower sliding surface 29 provided in the segment 21 are preferably flat surfaces that are not bent, and respectively slide on the upper slide 28 and the lower slide 30 in surface contact states.

Furthermore, in the segment 21, a lateral surface on an opposite side (the outer side in the tire radial direction) from a lateral surface to which the sector 13 is attached is an inclined surface 31 that is inclined outward in the tire radial direction as advancing downward.

The jacket ring 22 is a ring-shaped member that is provided on a radially outer side of the plural segments 21, and is provided with the through holes 36, each of which corresponds to the bolt hole 25 provided in the segment 21 and penetrates the jacket ring 22 in the tire radial direction. Each of the through holes 36 is closed by a sealing member 37 that is attachable/detachable to/from the jacket ring 22.

An inner circumferential surface of the jacket ring 22 is inclined along the inclined surface 31, which is provided on the outer side in the tire radial direction of the segment 21, and is slidably coupled to the inclined surface 31. The jacket ring 22 supports the segment 21 that is separated upward from the lower attachment plate 24 (see FIG. 6). In addition, as depicted in FIGS. 1, 2, and 5, in a state where the segment 21 is placed on the lower slide 30 of the lower attachment plate 24, the jacket ring 22 is lifted or lowered relative to the segment 21. In this way, while sliding on the inclined surface 31 provided in the segment 21, the jacket ring 22 causes the segment 21 to move in the tire radial direction. As a result, the sector 13, which is held by the segment 21, is configured to allow displacement thereof in the manner increase/reduce a diameter in the tire radial direction.

In the mold closed state where the jacket ring 22 causes the segment 21 to move inward in the tire radial direction and brings the sectors 13, which are adjacent to each other in the circumferential direction, into tight contact with each other, the through hole 36, which is provided in the jacket ring 22, communicates with the bolt hole 25 provided in the segment 21. In this way, in the mold closed state of the tire vulcanizer, the bolt 26, which fixes the sector 13 to the segment 21, can be screwed/unscrewed.

The upper side plate 11 and the upper slide 28 are fixed to a lower surface of the upper attachment plate 23 by bolts, which are not depicted.

Either one of the upper side plate 11 and the upper attachment plate 23 (in this example, the upper attachment plate 23) is provided with a second projection pin 32 that has a tapered shape and is projected toward the other (in this example, the upper side plate 11), and the other is provided with a second recessed section 33 into which the second projection pin 32 is fitted. The second recessed section 33 has a conical shape that corresponds to the shape of the second projection pin 32 and is narrowed toward a bottom. When the second projection pin 32 is fitted into the second recessed section 33, a relative position between the upper side plate 11 and the upper attachment plate 23 is adjusted, and the upper side plate 11 is thereby positioned. The second projection pin 32 may be provided in the upper side plate 11, and the second recessed section 33 may be provided in the upper attachment plate 23.

The upper slide 28 is arranged at a position that is on the outer side in the tire radial direction of the upper side plate 11 and that opposes the upper sliding surface 27, which is provided on the upper surface of the segment 21. The segment 21 is coupled to the upper slide 28 in a slidable manner in the tire radial direction. As depicted in FIG. 6, the upper slide 28 supports the segment 21 in the state of being separated upward from the lower attachment plate 24, and guides the movement of the segment 21 during the movement of the segment 21 in the tire radial direction.

The lower side plate 12 and the lower slide 30 are fixed to an upper surface of the lower attachment plate 24 by bolts, which are not depicted.

Either one of the lower side plate 12 and the lower attachment plate 24 (in this example, the lower attachment plate 24) is provided with a second projection pin 34 that has a tapered shape and is projected toward the other (in this example, the lower side plate 12), and the other is provided with a second recessed section 35 into which the second projection pin 34 is fitted. The second recessed section 35 has a conical shape that corresponds to the shape of the second projection pin 34 and is narrowed toward a bottom. When the second projection pin 34 is fitted into the second recessed section 35, a relative position between the lower side plate 12 and the lower attachment plate 24 is adjusted, and the lower side plate 12 is thereby positioned. The second projection pin 34 may be provided in the lower side plate 12, and the second recessed section 35 may be provided in the lower attachment plate 24.

The lower slide 30 is arranged at a position that is on the outer side in the tire radial direction of the lower side plate 12 and that opposes the lower sliding surface 29, which is provided on the lower surface of the segment 21. The lower slide 30 supports the segment 21 in a manner to allow sliding thereof in the tire radial direction, and guides the movement of the segment 21 during the movement of the segment 21 in the tire radial direction.

A heater, which is not depicted, is provided in the lower attachment plate 24, the jacket ring 22, and the like. The heater is configured to include a heating medium and a pipe through which the heating medium flows, and heats the entire vulcanizing mold 10.

The first lifting/lowering means 50 lifts/lowers the upper attachment plate 23 relative to the lower attachment plate 24. The second lifting/lowering means 51 lifts/lowers the jacket ring 22 separately from the segment 21 supported by the upper attachment plate 23.

The bladder 60 is formed of an expandable or contractable rubber resilient body in a toroidal shape in which a central portion in the axial direction is swollen outward. The bladder 60 is arranged on an inner surface side of the green tire, is inflated when being supplied with pressurized gas (for example, steam or nitrogen gas), and pressurizes the green tire from the inner side. An upper end and a lower end as both ends of the bladder 60 in the axial direction are supported by an extension/contraction support section 61. The bladder 60 is configured to supply/discharge the pressurized gas to/from the inside via a fluid port, which is not depicted. The extension/contraction support section 61 is a member that supports the bladder 60 in a manner to allow extension/contraction of a distance between the upper end and the lower end of the bladder 60. The extension/contraction support section 61 includes: an upper cramp ring 62 that fixes the upper end of the bladder 60; a lower cramp ring 63 that fixes the lower end of the bladder 60; and an extendable/contractable shaft section 64 that can be extended/contracted.

The green tire is vulcanized and shaped by using the tire vulcanizer having the configuration that has been described so far. In this way, a pneumatic tire is manufactured.

In detail, the green tire that has been built by a known method is set in the vulcanizing mold 10 of the tire vulcanizer in a mold open state. After the bladder 60 is attached to the inner surface side of the green tire, the vulcanizing mold 10 is brought into the mold closed state as depicted in FIG. 1.

In order to shift the vulcanizing mold 10 from the mold open state to the mold closed state, the first lifting/lowering means 50 lowers the upper side plate 11, which is provided on the upper attachment plate 23, and the segment 21, and the second lifting/lowering means 51 lowers the jacket ring 22 and the segment 21 attached thereto.

A speed at which the first lifting/lowering means 50 lowers the upper side plate 11 and the segment 21 is set to be equal to a speed at which the second lifting/lowering means 51 lowers the jacket ring 22 and the segment 21. Accordingly, the segments 21 and the sectors 13 do not move in the tire radial direction. The upper side plate 11, the sectors 13, the segments 21, and the jacket ring 22 move downward and come close to the lower side plate 12, which is provided on the lower attachment plate 24.

Then, when the lower sliding surface 29 of the segment 21 is placed on the lower slide 30 of the lower attachment plate 24, the second lifting/lowering means 51 further lowers the jacket ring 22. In this way, the lower sliding surface 29 slides on the lower slide 30 of the lower attachment plate 24, the upper sliding surface 27 slides on the upper slide 28 of the upper attachment plate 23, and the segment 21 thereby moves inward in the tire radial direction. The upper sliding surface 27 and the lower sliding surface 29 provided in the segment 21 are inclined such that the outer sides in the tire radial direction thereof are directed toward the central portion in the tire width direction. Accordingly, when the sector 13 moves inward in the tire radial direction with the segment 21, the upper side plate 11 is lowered by the inclination of the upper sliding surface 27, and the segment 21 and the sector 13 are lowered by the inclination of the lower sliding surface 29. That is, in conjunction with the inward movement of the segment 21 and the sector 13 in the tire radial direction, the distance between the mold parting surfaces 16 defined by the sector 13 and the upper side plate 11 is gradually reduced, and the distance between the mold parting surfaces 17 defined by the sector 13 and the lower side plate 12 is gradually reduced.

Then, the segment 21 and the sector 13 move inward in the tire radial direction by a specified amount. At this time, the adjacent sectors 13 in the tire circumferential direction come into contact with each other before the upper and lower pair of the upper flange section 13a and the lower flange section 13b comes into contact with the upper and lower pair of the upper side plate 11 and the lower side plate 12.

After the adjacent sectors 13 in the tire circumferential direction contact each other, the sectors 13 further move inward in the tire radial direction and reach the mold closed positions where the adjacent sectors 13 in the tire circumferential direction tightly contact each other. When each of the sectors 13 reaches the mold closed position, the upper flange section 13a and the lower flange section 13b respectively contact the upper side plate 11 and the lower side plate 12. In this way, the further inward movement of the sector 13 in the tire radial direction is restricted, and the sector 13 does move inward in the tire radial direction from the mold closed position (the position where the adjacent sectors 13 in the tire circumferential direction tightly contact each other).

In addition, in a state where the sector 13 has reached the mold closed position, the mold parting surfaces 16, 17 defined by the sector 13, the upper side plate 11, and the lower side plate 12 tightly contact each other, and the vulcanizing mold 10 is brought into the mold closed state as depicted in FIG. 1.

Note that, when the sector 13 moves inward in the tire radial direction to the mold closed position as described above, the first projection pins 18 provided in the upper flange section 13a and the lower flange section 13b are fitted into the first recessed sections 19 provided in the end surface 11b of the upper side plate 11 and the end surface 12b of the lower side plate 12, and thereby position the sector 13 in the tire circumferential direction with respect to the upper side plate 11 and the lower side plate 12.

After the vulcanizing mold 10 is closed as described above, the bladder 60 is supplied with the pressurizing gas and is inflated. In this way, the green tire is pressurized and heated between the vulcanizing mold 10 and the bladder 60, and such a state is maintained for a specified period. As a result, the tire T is vulcanized and shaped.

After the green tire is vulcanized, the vulcanizing mold 10 is brought into the mold open state, and a taking-out process to take out the vulcanized tire T from the tire vulcanizer is performed.

In order to shift the vulcanizing mold 10 from the mold closed state to the mold open state, initially, the second lifting/lowering means 51 lifts the jacket ring 22 and causes the sector 13, which is held by the segment 21, to move outward in the tire radial direction. In this way, the diameter of the sector 13 is increased. At this time, the first lifting/lowering means 50 is stopped. However, when the upper attachment plate 23 and the lower attachment plate 24 are applied with an external force in the vertical direction, the upper attachment plate 23 moves upward by such an external force.

As described above, in the tire vulcanizer of this embodiment, the upper sliding surface 27 and the lower sliding surface 29 provided in the segment 21 are inclined such that the outer sides in the tire radial direction thereof are directed toward the central portion in the tire width direction. Accordingly, when the segment 21 moves outward in the tire radial direction as depicted in FIG. 2, the upper sliding surface 27 slides outward in the tire radial direction on the upper slide 28 of the upper attachment plate 23 while pressing the upper attachment plate 23 upward, and the lower sliding surface 29 slides outward in the tire radial direction on the lower slide 30 of the lower attachment plate 24 while pressing the lower attachment plate 24 downward.

The upper attachment plate 23, which is pressed upward by the upper sliding surface 27, moves upward with respect to the segment 21. Accordingly, when the segment 21 starts moving radially outward, as depicted in FIG. 3, the upper side plate 11, which is fixed to the upper attachment plate 23, also moves upward with respect to the segment 21, and the distance between the mold parting surfaces 16 defined by the sector 13 and the upper side plate 11 is increased.

In addition, the lower attachment plate 24, which is pressed downward by the lower sliding surface 29, moves downward with respect to the segment 21. Accordingly, when the segment 21 starts moving radially outward, as depicted in FIG. 4, the lower side plate 12, which is fixed to the lower attachment plate 24, also moves downward with respect to the segment 21, and the distance between the mold parting surfaces 17 defined by the sector 13 and the lower side plate 12 is increased. Note that, in the case where the lower attachment plate 24 is fixed and where the segment 21 starts moving radially outward, the segment 21 moves upward, and the distance between the mold parting surfaces 17 defined by the sector 13 and the lower side plate 12 is increased.

Then, after the increase in the diameter of the sector is completed as depicted in FIG. 5, the first lifting/lowering means 50 is lifted. In this way, as depicted in FIG. 6, the upper side plate 11, which is provided on the upper attachment plate 23, and the sector 13 are lifted. That is, the upper side plate 11 and the sector 13 are separated from the lower side plate 12, and a mold opening operation of the upper side plate 11 and the lower side plate 12 is thereby performed. Thereafter, the vulcanized tire T is taken out from the tire vulcanizer in the mold open state. Note that, while the upper sideplate 11 and the sector 13 move upward, the jacket ring 22 is lifted in a synchronized manner with the upper side plate 11 by the second lifting/lowering means 51, so as to maintain the increased diameter state of the sector 13.

In the tire vulcanizer of this embodiment, the sector 13 includes: the upper flange section 13a projected from the mold parting surface 16; and the lower flange section 13b projected from the mold parting surface 17. When each of the adjacent sectors 13 in the tire circumferential direction reaches the mold closed position where the sectors 13 tightly contact each other, the upper flange section 13a and the lower flange section 13b respectively contact the upper side plate 11 and the lower side plate 12. Thus, each of the sectors 13 does not move inward in the tire radial direction from the mold closed position. Accordingly, even in the case where some of the plural sectors 13 reach the mold closed positions prior to the other sectors 13, all of the sectors 13 can be arranged at the specified positions during closing of the vulcanizing mold 10. Therefore, it is possible to suppress a vulcanization molding defect.

In the tire vulcanizer of this embodiment, the upper flange section 13a and the lower flange section 13b are each provided with the first projection pin 18, and the upper side plate 11 and the lower side plate 12 are each provided with the first recessed section 19, into which the first projection pin 18 is fitted. Accordingly, in the mold closed state, the sector 13 can be positioned in the tire circumferential direction with respect to the upper sideplate 11 and the lower sideplate 12. In the tire vulcanizer of this embodiment, the groove shaping rib 13c provided in the sector 13 appropriately continues to the recessed section shaping ribs 11a, 12a provided in the upper side plate 11 and the lower side plate 12. As a result, it is possible to favorably create a pattern design that continues from a tread surface to each of the sidewalls without deviation in the circumferential direction.

In the tire vulcanizer of this embodiment, when the sectors 13 move inward in the tire radial direction during closing of the mold, the adjacent sectors 13 in the tire circumferential direction come into contact with each other. Thereafter, the upper flange section 13a and the lower flange section 13b respectively come into contact with the upper side plate 11 and the lower side plate 12. Thus, a substantial amount of a force by the second lifting/lowering means 51 for pressing the sector 13 radially inward via the jacket ring 22 and the segment 21 is applied to contact surfaces between the adjacent sectors 13 in the circumferential direction. In this way, the adjacent sectors 13 in the circumferential direction can tightly contact each other.

In the tire vulcanizer of this embodiment, the upper sliding surface 27 and the lower sliding surface 29, which respectively slide on the upper attachment plate 23 and the lower attachment plate 24, are inclined such that the outer sides in the tire radial direction thereof are directed toward the central portion in the tire width direction. Accordingly, when the segment 21 moves inward in the tire radial direction, the distances between the mold parting surfaces 16, 17 are gradually reduced. Meanwhile, when the segment 21 moves outward in the tire radial direction, the distances between the mold parting surfaces 16, 17 are gradually increased. That is, when the sector 13 is located at the mold closed position, the mold parting surfaces 16, 17 defined by the sector 13, the upper side plate 11, and the lower side plate 12 tightly contact each other. Meanwhile, when the sector 13 is located outward in the tire radial direction from the mold closed position, clearances are generated between the mold parting surfaces 16, 17. Accordingly, even when the tire vulcanizer is repeatedly opened/closed, the mold parting surfaces 16, 17 do not rub against each other. Therefore, durability of the tire vulcanizer can be improved.

In addition, immediately after the segment 21 starts moving radially outward, the upper side plate 11 moves with the upper attachment plate 23 in a direction away from the tire T that has been vulcanized and shaped. Thus, the tire T can easily be taken out from the vulcanizing mold 10.

In the tire vulcanizer of this embodiment, the upper attachment plate 23 and the lower attachment plate 24 are each provided with the second projection pin 32, and the upper side plate 11 and the lower side plate 12 are each provided with the second recessed section 35, into which the second projection pin 32 is fitted. Accordingly, the upper side plate 11 and the lower side plate 12 can be positioned in the tire circumferential direction with respect to the upper attachment plate 23 and the lower attachment plate 24. In this way, the groove shaping rib 13c provided in the sector 13 appropriately continues to the recessed section shaping ribs 11a, 12a provided in the upper side plate 11 and the lower side plate 12. As a result, it is possible to favorably create the pattern design that continues from the tread surface to each of the sidewalls without the deviation in the circumferential direction.

Modified Embodiment

A description will be made on a modified embodiment of the present invention with reference to FIG. 7. Note that the same components as those in the above embodiment will be denoted by the same reference signs, and the detailed description thereon will not be made.

In the above embodiment, the description has been made on the case where the mold parting surfaces 16, 17 defined by the sector 13, the upper side plate 11, and the lower side plate 12 are parallel with the tire radial direction. However, the present invention is not limited to such a case, and the mold parting surfaces only have to extend outward in the tire radial direction from the mold inner ends thereof arranged on the tread 1 of the tire.

For example, as depicted in FIG. 7, in a tire vulcanizer of this modified embodiment, mold parting surfaces 160, 170 defined by the sector 13, the upper side plate 11, and the lower side plate 12 are obliquely inclined with respect to the tire radial direction such that inner sides in the tire radial direction thereof (that is, sides of mold inner ends 160a, 170a) are directed toward the central portion in the tire width direction.

In the tire vulcanizer of this modified embodiment, the mold parting surfaces 160, 170 defined by the sector 13, the upper side plate 11, and the lower side plate 12 are obliquely inclined with respect to the tire radial direction such that the inner sides in the tire radial direction thereof are directed toward the central portion in the tire width direction. In such a tire vulcanizer, when the sector 13 moves inward in the tire radial direction from the mold closed position, the mold parting surfaces 160, 170 rub against each other to cause wear. However, in this modified example, when the sector 13 reaches the mold closed position, the upper flange section 13a and the lower flange section 13b respectively come into contact with the upper side plate 11 and the lower side plate 12. Thus, the sector 13 does not move inward in the tire radial direction from the mold closed position. Therefore, it is possible to suppress the wear of the mold parting surfaces 160, 170, and it is thus possible to improve durability of the tire vulcanizer. Note that the rest of the configuration and operational effects of the modified embodiment are the same as those in the above embodiment, and thus the detailed description thereon will not be made.

The embodiments that have been described so far are merely provided as examples and thus have no intention to limit the scope of the invention. These novel embodiments can be implemented in any of various other aspects, and various types of elimination, replacement, and changes can be made thereto within the scope that does not depart from the gist of the invention.

What is claimed is:

1. A tire vulcanizer that vulcanizes and shapes a tire, the tire vulcanizer comprising:
   a sector that shapes a tread of the tire and is divided in a tire circumferential direction to a plurality of circumferentially adjacent sectors;
   a plurality of segments, to which each of the plurality of circumferentially adjacent sectors is fixed, and which causes the sector to move in a tire radial direction;
   paired upper side plate and lower side plate that shape sidewalls of the tire; and
   a first mold parting surface and a second mold parting surface that each are defined by the sector and the paired upper side plate and lower side plate, wherein
   a first mold inner end of the first mold parting surface and a second mold inner end of the second mold parting surface are arranged on the tread, and the first mold parting surface and the second mold parting surface extend outward in the tire radial direction from the first mold inner end and second mold inner end respectively,
   each of the plurality of circumferentially adjacent sectors includes paired upper flange section and lower flange section, each of which is projected from the first mold parting surface and the second mold parting surface, and the paired upper flange section and lower flange section respectively abut the paired upper side plate and lower side plate in a state where each of the plurality of adjacent sectors in the tire circumferential direction tightly contact each other, and
   either the upper flange section and the lower flange section, or the upper side plate and the lower side plate includes a first projection pin that is projected toward the other, and the other includes a first recessed section into which the first projection pin is fitted.

2. The tire vulcanizer according to claim 1, wherein the first mold parting surface and the second mold parting surface are provided in parallel with the tire radial direction.

3. The tire vulcanizer according to claim 1, wherein in the case where each of the plurality of adjacent segments causes the sector to move inward in the tire radial direction, the plurality of sectors in the tire circumferential direction come into contact with each other before the paired upper flange section and lower flange section respectively come into contact with the paired upper side plate and lower side plate.

4. A tire vulcanizer that vulcanizes and shapes a tire, the tire vulcanizer comprising:
- a sector that shapes a tread of the tire and is divided in a tire circumferential direction to a plurality of circumferentially adjacent sectors;
- a plurality of segments, to which each of the plurality of circumferentially adjacent sectors is fixed, and which causes the sector to move in a tire radial direction;
- paired upper side plate and lower side plate that shape sidewalls of the tire; and
- a first mold parting surface and a second mold parting surface that each are defined by the sector and the paired upper side plate and lower side plate, wherein
- a first mold inner end of the first mold parting surface and a second mold inner end of the second mold parting surface are arranged on the tread, and the first mold parting surface and the second mold parting surface extend outward in the tire radial direction from the first mold inner end and second mold inner end respectively,
- each of the plurality of circumferentially adjacent sectors includes paired upper flange section and lower flange section, each of which is projected from the first mold parting surface and the second mold parting surface, and the paired upper flange section and lower flange section respectively abut the paired upper side plate and lower side plate in a state where each of the plurality of adjacent sectors in the tire circumferential direction tightly contact each other; and further comprising:
- paired upper attachment plate and lower attachment plate that are respectively fixed to the paired upper side plate and lower side plate and support the plurality of segments in a manner to allow sliding of the plurality of segments, wherein
- each segment of the plurality of segments includes paired upper sliding surface and lower sliding surface that respectively slide on the paired upper attachment plate and lower attachment plate,
- the paired upper sliding surface and lower sliding surface are inclined such that outer sides in the tire radial direction thereof are directed toward a central portion in a tire width direction, and
- when the plurality of segments causes the sector to move outward in the tire radial direction, the paired upper sliding surface and lower sliding surface respectively slide on the paired upper attachment plate and lower attachment plate, and a distance between the first mold parting surface and the second mold parting surface is increased.

5. The tire vulcanizer according to claim 4, wherein either one of the upper side plate and lower side plate or the upper attachment plate and the lower attachment plate includes a second projection pin that is projected toward the other, and the other includes a second recessed section into which the second projection pin is fitted.

6. The tire vulcanizer according to claim 1, wherein the sector is formed of iron.

* * * * *